United States Patent
Weiland et al.

(10) Patent No.: US 10,309,796 B2
(45) Date of Patent: Jun. 4, 2019

(54) METHOD OF REPRESENTING ROAD LANES

(71) Applicant: HERE Global B.V., Eindhoven (NL)

(72) Inventors: Michael Weiland, Gurnee, IL (US); Gregory Nyczak, Hinsdale, IL (US); William McDonough, Glen Ellyn, IL (US); Michael Tsengouras, Lake Villa, IL (US); David Shuman, Deer Park, IL (US); Paul Ford, Oak Park, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/299,079

(22) Filed: Oct. 20, 2016

(65) Prior Publication Data

US 2017/0045370 A1    Feb. 16, 2017

Related U.S. Application Data (60) Continuation of application No. 12/804,018, filed on Jul. 12, 2010, now Pat. No. 9,494,434, and a division
(Continued)

(51) Int. Cl.
  *G01C 21/36*    (2006.01)
  *G06F 16/50*    (2019.01)
(Continued)

(52) U.S. Cl.
  CPC .............. *G01C 21/367* (2013.01); *B60T 8/17* (2013.01); *G01C 21/26* (2013.01); *G01C 21/32* (2013.01);
(Continued)

(58) Field of Classification Search
  CPC ...... G01C 21/367; G01C 21/32; G01C 21/26; B60T 8/17; G06F 17/30244; G06F 17/3028; Y02T 10/82
(Continued)

(56) References Cited

U.S. PATENT DOCUMENTS 4,907,160 A    3/1990 Duncan et al.
5,434,788 A    7/1995 Seymour et al.
(Continued)

FOREIGN PATENT DOCUMENTS

EP    1096229    5/2001
EP    1111336    6/2001
(Continued)

OTHER PUBLICATIONS

European Search Report cited in EP03257191.1, dated Jun. 21, 2007.
(Continued)

*Primary Examiner* — Tuan C To
(74) *Attorney, Agent, or Firm* — Lempia Summerfield Katz LLC (57) ABSTRACT

A method is disclosed for representing road lanes as data in a database that can be used by a system in a vehicle to provide a safety-related function. Each data representation of a physical road lane includes data indicating start and end points of the represented lane and other data attributes pertaining to the represented lane, including data indicating what physical features are adjacent to the represented lane on right and left sides thereof and data indicating a geometry of the represented lane. The database is compatible with navigation-related applications that use a different data model to provide navigation-related functions.

19 Claims, 9 Drawing Sheets

Related U.S. Application Data of application No. 10/620,732, filed on Jul. 16, 2003, now abandoned, and a continuation-in-part of application No. 10/465,890, filed on Jun. 19, 2003, now Pat. No. 9,341,485.

(51) Int. Cl.
*G06F 16/51* (2019.01)
*G01C 21/32* (2006.01)
*G06F 17/30* (2006.01)
*G01C 21/26* (2006.01)
*B60T 8/17* (2006.01)
*G06F 17/00* (2019.01)
*G06F 19/00* (2018.01)

(52) U.S. Cl.
CPC .............. *G06F 16/50* (2019.01); *G06F 16/51* (2019.01); *G06F 17/00* (2013.01); *G06F 17/3028* (2013.01); *G06F 17/30244* (2013.01); *G06F 19/00* (2013.01); *Y02T 10/82* (2013.01)

(58) Field of Classification Search
USPC ............................................................ 701/70
See application file for complete search history.

(56) References Cited

U.S. PATENT DOCUMENTS

| | | | |
|---|---|---|---|
| 5,508,930 A | | 4/1996 | Smith, Jr. |
| 5,642,093 A | | 6/1997 | Kinoshita et al. |
| 5,765,116 A | * | 6/1998 | Wilson-Jones ...... B62D 15/025 |
| | | | 180/168 |
| 5,798,949 A | | 8/1998 | Kaub |
| 5,902,350 A | | 5/1999 | Tamai et al. |
| 5,910,177 A | | 6/1999 | Zuber |
| 5,926,117 A | | 7/1999 | Gunji et al. |
| 5,928,308 A | | 7/1999 | Nanba et al. |
| 6,018,697 A | | 1/2000 | Morimoto et al. |
| 6,028,550 A | | 2/2000 | Froeberg et al. |
| 6,076,041 A | * | 6/2000 | Watanabe .......... G01C 21/3644 |
| | | | 340/988 |
| 6,134,501 A | | 10/2000 | Oumi |
| 6,161,071 A | * | 12/2000 | Shuman ................. B60K 28/06 |
| | | | 340/436 |
| 6,184,823 B1 | * | 2/2001 | Smith ..................... G01C 21/32 |
| | | | 342/357.31 |
| 6,188,957 B1 | | 2/2001 | Bechtolsheim et al. |
| 6,192,312 B1 | * | 2/2001 | Hummelsheim ...... G01C 21/30 |
| | | | 340/988 |
| 6,212,472 B1 | * | 4/2001 | Nonaka .................. G01C 21/36 |
| | | | 340/990 |
| 6,223,124 B1 | * | 4/2001 | Matsuno ............. G01C 21/3407 |
| | | | 340/988 |
| 6,226,389 B1 | | 5/2001 | Lemelson et al. |
| 6,249,740 B1 | | 6/2001 | Ito et al. |
| 6,269,304 B1 | | 7/2001 | Kaji et al. |
| 6,269,305 B1 | | 7/2001 | Yamashita et al. |
| 6,278,943 B1 | | 8/2001 | Yamauchi |
| 6,292,752 B1 | | 9/2001 | Franke et al. |
| 6,314,367 B1 | | 11/2001 | Ohler et al. |
| 6,347,280 B1 | | 2/2002 | Inoue et al. |
| 6,360,165 B1 | | 3/2002 | Chowdhary |
| 6,370,474 B1 | | 4/2002 | Hiwatashi et al. |
| 6,385,536 B2 | | 5/2002 | Kimura |
| 6,405,128 B1 | * | 6/2002 | Bechtolsheim .... G01C 21/3667 |
| | | | 340/988 |
| 6,405,131 B1 | | 6/2002 | Barton |
| 6,411,901 B1 | * | 6/2002 | Hiwatashi ............... B60Q 1/52 |
| | | | 340/435 |
| 6,415,226 B1 | | 7/2002 | Kozak |
| 6,434,480 B1 | | 8/2002 | Kubota et al. |
| 6,438,491 B1 | | 8/2002 | Farmer |
| 6,438,494 B1 | * | 8/2002 | Yamamoto ............. E01C 1/002 |
| | | | 701/408 |
| 6,446,000 B2 | | 9/2002 | Shimabara |
| 6,470,265 B1 | | 10/2002 | Tanaka |
| 6,505,117 B1 | | 1/2003 | Ratert et al. |
| 6,510,382 B2 | | 1/2003 | Wilson |
| 6,510,386 B2 | | 1/2003 | Sakashita |
| 6,526,348 B1 | | 2/2003 | McDonough |
| 6,539,300 B2 | | 3/2003 | Myr |
| 6,587,781 B2 | | 7/2003 | Feldman et al. |
| 6,597,986 B2 | | 7/2003 | Mikame |
| 6,611,753 B1 | | 8/2003 | Millington |
| 6,624,782 B2 | | 9/2003 | Jocoy et al. |
| 6,720,920 B2 | | 4/2004 | Breed et al. |
| 6,819,779 B1 | | 11/2004 | Nichani |
| 7,072,764 B2 | * | 7/2006 | Donath ..................... B60R 1/00 |
| | | | 340/990 |
| 7,082,443 B1 | | 7/2006 | Ashby |
| 7,124,027 B1 | | 10/2006 | Ernst, Jr. et al. |
| 7,152,022 B1 | * | 12/2006 | Joshi ..................... G01C 21/32 |
| | | | 703/2 |
| 7,383,126 B2 | | 6/2008 | Takahashi |
| 7,502,685 B2 | | 3/2009 | Nakamura |
| 7,630,832 B2 | | 12/2009 | Kim et al. |
| 7,725,424 B1 | * | 5/2010 | Ponte ................ G06F 17/30867 |
| | | | 707/715 |
| 7,783,422 B2 | | 8/2010 | Tanaka |
| 8,068,982 B2 | | 11/2011 | Takada |
| 8,134,480 B2 | | 3/2012 | Onome et al. |
| 8,195,386 B2 | | 6/2012 | Hu et al. |
| 8,630,801 B2 | | 1/2014 | Katzer |
| 9,046,380 B2 | | 6/2015 | Mori et al. |
| 9,103,671 B1 | | 8/2015 | Breed et al. |
| 9,120,485 B1 | * | 9/2015 | Dolgov ................. B60W 30/10 |
| 10,051,411 B2 | | 8/2018 | Breed |
| 2001/0040505 A1 | * | 11/2001 | Ishida ............... G01C 21/3697 |
| | | | 340/435 |
| 2001/0056326 A1 | | 12/2001 | Kimura |
| 2002/0013659 A1 | | 1/2002 | Kusama |
| 2002/0014979 A1 | | 2/2002 | Wilson |
| 2002/0018004 A1 | | 2/2002 | Raswant |
| 2002/0036584 A1 | | 3/2002 | Jocoy et al. |
| 2002/0103622 A1 | | 8/2002 | Burge |
| 2002/0184236 A1 | * | 12/2002 | Donath ..................... G01V 1/00 |
| 2002/0198694 A1 | | 12/2002 | Yang et al. |
| 2003/0023614 A1 | | 1/2003 | Newstrom et al. |
| 2003/0055562 A1 | | 3/2003 | Levy et al. |
| 2003/0074131 A1 | | 4/2003 | Barkowski et al. |
| 2003/0093209 A1 | * | 5/2003 | Andersson ......... B60K 31/0058 |
| | | | 701/93 |
| 2003/0100992 A1 | * | 5/2003 | Khosla .................... G01C 21/26 |
| | | | 701/514 |
| 2003/0101036 A1 | * | 5/2003 | Nagel .................... G01C 21/32 |
| | | | 703/13 |
| 2003/0187578 A1 | | 10/2003 | Nishira et al. |
| 2004/0020698 A1 | | 2/2004 | Gehrke et al. |
| 2004/0030670 A1 | * | 2/2004 | Barton ................... G01C 21/32 |
| 2009/0140887 A1 | | 6/2009 | Breed et al. |
| 2013/0332004 A1 | | 12/2013 | Gompert et al. |
| 2014/0180914 A1 | | 6/2014 | Abhyanker |
| 2014/0210646 A1 | | 7/2014 | Subramanya |
| 2015/0168174 A1 | | 6/2015 | Abramson et al. |
| 2015/0185034 A1 | | 7/2015 | Abhyanker |

FOREIGN PATENT DOCUMENTS

| | | | | |
|---|---|---|---|---|
| JP | | 2000047573 A | * | 2/2000 |
| KR | | 20010064815 A | * | 7/2001 |
| WO | | WO9957516 | | 11/1999 |
| WO | | WO-9964820 A1 | * | 12/1999 ......... G01C 21/3605 |

OTHER PUBLICATIONS

Fohl et al., A Non-Planar, Lane-Based Navigable Data Model for ITS, Aug. 1996, pp. 7617-7629, National Center for Geographic Infromation and Analysis.

Rogers et al., Mining GPA Data to Augment Road Models, NEC Research Index, 1999, 21 pages.

(56) References Cited

OTHER PUBLICATIONS

U.S. Appl. No. 09/918,668, filed Jul. 31, 2002.

\* cited by examiner

METHOD OF REPRESENTING ROAD LANES

REFERENCE TO RELATED APPLICATIONS

This application is a continuation under 37 C.F.R. § 1.53(b) and 35 U.S.C. § 120 of U.S. patent application Ser. No. 12/804,018 filed Jul. 12, 2010, which is a divisional of Ser. No. 10/620,732, filed Jul. 16, 2003, which was a continuation-in-part of the Ser. No. 10/465,890 (now U.S. Pat. No. 9,341,485), entitled "METHOD OF REPRESENTING ROAD INTERSECTIONS," filed Jun. 19, 2003, the entire disclosure of each of which is incorporated herein by reference.

BACKGROUND OF THE INVENTION

The present invention relates to methods for representing roads as data in a database and more particularly, the present invention relates to methods for representing road lanes in a database used for vehicle driver assistance systems.

Vehicle driver assistance systems, such as systems for obstacle warning and avoidance, lane departure warning, collision warning and avoidance, adaptive cruise control, adaptive transmission operation, automatic headlight aiming, and so on, have been developed to improve the safety and convenience of vehicle operation. These systems include technologies that augment a driver's ability to operate a vehicle safely and efficiently. Some of these systems include equipment that senses features around the vehicle. In addition, some of these systems use data that models the road network upon which the vehicle is traveling. Based on the sensed features and the model of the road network, the driver assistance and safety systems may provide warnings or otherwise modify operation of the vehicle to improve safety or convenience.

Data representations of the road network have also been used for various other purposes. For example, data representations of the road network are used in vehicle navigation systems to provide navigation-related features, such as route calculation, route guidance, map display and destination selection. In some databases used by navigation systems, each road segment is represented by one or more data records or entities. Associated with each data record or entity are attributes that describe various features of the represented road segment. Some of the features of a road segment that are represented by such data records include the location of the road segment, the locations of road intersections, the name of the road segment, the speed limit (or speed category) along the road segment, the number of lanes along the road segment, any highway designations of the road segment, the type of road surface (e.g., paved, unpaved, gravel), the presence of any lane dividers, etc.

The ways that roads are represented in databases used in navigation systems are useful. However, the ways that roads are represented in databases used for navigation purposes may not be suitable for driver assistance and safety systems. For example, for navigation purposes, it is important to have data that indicate the speed limits along roads, the names of roads, the address ranges along road segments, and how much time it might take to cross a road intersection. For navigation purposes, the exact path that a vehicle takes along a road segment is not necessarily important unless the vehicle is approaching an upcoming maneuver. However, for driver assistance systems, such as obstacle avoidance or warning systems, the paths that vehicles take along a road segment may be needed to provide a warning or take another action.

Accordingly, it is an objective to provide a data model for roads, and in particular for lanes along roads, that can be used by driver assistance systems.

It is another objective to provide a data model for road lanes that is compatible with various uses of the data.

SUMMARY OF THE INVENTION

To address these and other objectives, the present invention includes a method and system representing road lanes as data in a database that can be used by a system in a vehicle to provide a safety-related function. Each data representation of a physical road lane includes data indicating start and end points of the represented lane and other data attributes pertaining to the represented lane, including data indicating what physical features are adjacent to the represented lane on right and left sides thereof and data indicating a geometry of the represented lane. Further, at least some of the data representations of lanes are associated with data representations of sublanes. Each data representation of a sublane includes data indicating start and end points thereof, defined relative to the lane of which the sublane is a part. A data representation of a sublane includes at least one data attribute associated therewith that pertains to the represented sublane and that is different than the same attribute of the lane of which the sublane is a part. The database is compatible with navigation-related applications that use a different data model to provide navigation-related functions.

DETAILED DESCRIPTION OF THE PRESENTLY PREFERRED EMBODIMENTS

I. Exemplary Road Segment

A first embodiment relates to a method for representing roads, and in particular road lanes, in a database that contains data that represent a road network in a geographic region. The database is used by a system in a vehicle that provides safety or convenience features to the vehicle driver.

Figure 1:
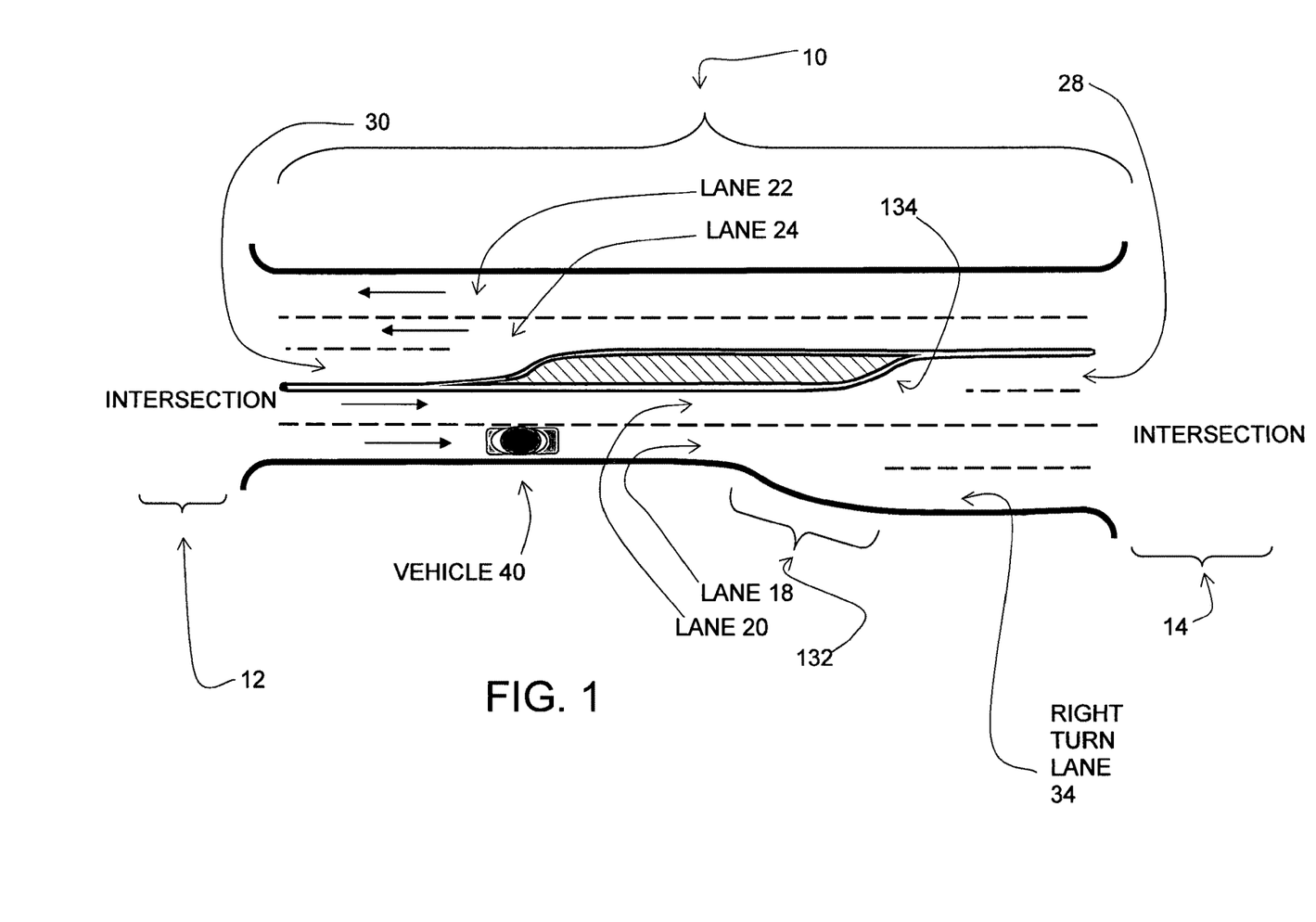
FIG. 1 is an illustration of an exemplary intersection located in a geographic area.

FIG. 1 shows an exemplary road segment 10, which is part of a road network located in a geographic region. The road segment 10 is comprised of a portion of a road between two adjacent intersections 12 and 14. Other road segments (not shown) connect to the intersections 12 and 14. The road segment 10 can be accessed by a vehicle from the other road segments via intersections 12 and 14.

The road segment 10 has several lanes in each direction. For example, the road segment 10 includes lanes 18, 20, 22, and 24 extending between the intersections 12 and 14. The lanes 18 and 20 are designed to carry vehicle traffic only in the direction from the intersection 12 to the intersection 14 and the lanes 22 and 24 are designed to carry vehicle traffic only in the direction from the intersection 14 to the intersection 12.

In addition, the road segment 10 includes some lanes that do not extend the entire length between the intersections 12 and 14. For example, the road segment 10 includes a left turn lane 28 leading into the intersection 14 and another left turn lane 30 leading into the intersection 12. These left turn lanes 28 and 30 extend only part of the way along the road segment 10. In addition, the road segment 10 includes a right turn lane 34 leading into the intersection 14. The right turn lane 34 extends only part of the way along the road segment 10.

The road segment 10 is one of many road segments that form the road network in the geographic region. The other roads segments may have different shapes and may have more lanes or fewer lanes.

II. Driver Assistance Systems

Figure 2:
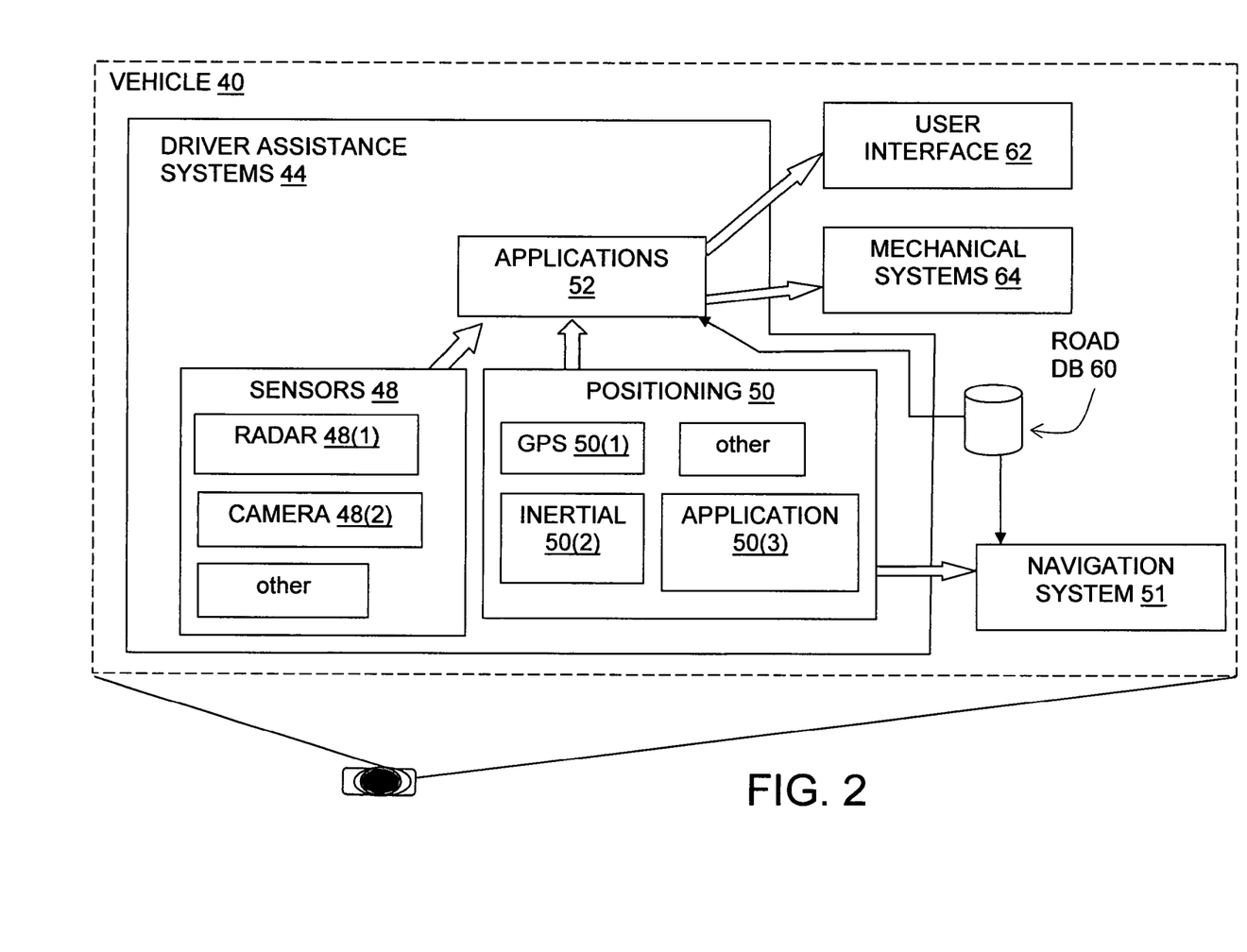
FIG. 2 is a block diagram that shows components of driver assistance systems in the vehicle shown in FIG. 1.

A vehicle 40 travels on the road segment 10. Although only one vehicle is shown in FIG. 1, the vehicle 40 is representative of many vehicles, which are similarly equipped, that travel on the roads in the geographic region. Referring to FIG. 2, the vehicle 40 includes one or more driver assistance or safety systems 44. The driver assistance systems 44 are systems that make operation of the vehicle safer or more convenient. The driver assistance systems 44 may include an obstacle warning system, a lane departure warning system, an adaptive cruise control system, and/or a collision avoidance system. The driver assistance systems 44 may include other systems in addition to, or instead of, any of these systems.

The driver assistance systems 44 are combinations of hardware and software components. The driver assistance systems 44 use sensors 48. Various different types of sensors may be used. Some of the sensors 48 measure (or are responsive to) a property, parameter, attribute, or characteristic of the vehicle or the environment around the vehicle. For example, the sensors 48 may include a radar system 48(1), a camera system 48(2), or other sensors.

The vehicle 40 includes a positioning system 50. In the embodiment shown in FIG. 2, the positioning system 50 is part of the driver assistance systems 44. Alternatively, the positioning system 50 may be part of another system in the vehicle 40, such as a navigation system 51. According to another embodiment, the positioning system 50 may be a standalone system in the vehicle. The positioning system 50 is a combination of hardware and software components. For example, the positioning system 50 may include a GPS or DGPS unit 50(1), one or more inertial sensors 50(2), such as a gyroscope or accelerometer, differential wheel sensors, or other types of equipment.

In a present embodiment, the driver assistance systems 44 include or use a road database 60. The road database 60 includes a data representation of the road network in the geographic region in which the vehicle 40 is traveling. In a present embodiment, the road database 60 includes data that indicate the positions of the roads, the intersections of roads, and the locations of lanes, as well as other information.

The road database 60 is used by an application 50(3) in the positioning system 50 to determine the position of the vehicle 40 relative to the road network. More specifically, the positioning application 50(3) uses the data in the road database 60 and outputs from other positioning system components, such as the GPS unit 50(1) and sensors 50(2), to determine the position of the vehicle along a road segment represented by data in the road database 60, the position of the vehicle relative to the lanes of the represented road segment, the direction and/or bearing of the vehicle along the represented road segment, and possibly other parameters.

The driver assistance systems 44 include driver assistance applications 52. The driver assistance applications 52 are programs that implement the functions of the driver assistance systems 44. The driver assistance applications 52 receive outputs from the sensors 48. The driver assistance applications 52 also use data from the road database 60. The driver assistance applications 52 may also receive other information. Based on the data received from the sensors 48, the data obtained from the road database 60, and possibly other information, the driver assistance applications 52 evaluate whether a warning or other action should be provided. The driver assistance systems 44 provide the safety or convenience features via a user interface 62 of the vehicle or by controlling a vehicle mechanical system 64. For example, a curve warning application may provide an audible alarm via speakers (i.e., part of the user interface 62 in the vehicle) or an obstacle avoidance application may engage the vehicle's brakes (i.e., one of the mechanical systems 64 in the vehicle).

III. Road Database

Figure 3:
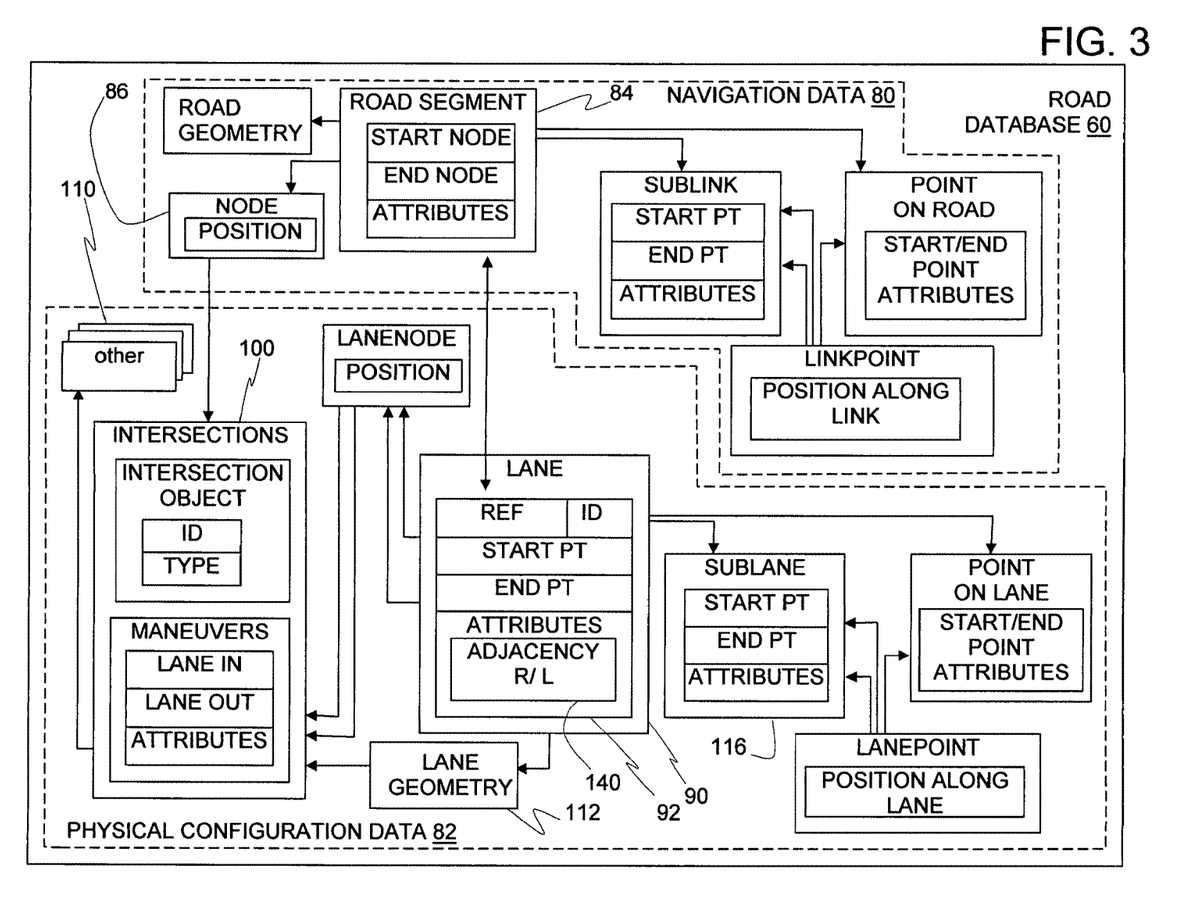
FIG. 3 is a block diagram that shows components of an embodiment of the road database of FIG. 2.

FIG. 3 shows components of the road database 60. In the embodiment shown in FIG. 3, roads are represented in different ways. These different ways relate to how the road data are used. The different ways that the road data are used affect which aspects of a road are represented. For example, in FIG. 3, the road database 60 includes navigation data 80 and physical configuration data 82. (In addition to navigation data 80 and physical configuration data 82, the road database 60 may include other collections of data that represent the roads in other ways.) In FIG. 3, the navigation data 80 and the physical configuration data 82 are indicated as being separate collections of data that are related to each other. However, in alternative embodiments, these different ways of representing roads may be included in a single collection of data.

The navigation data 80 are used by navigation-related applications, such as route calculation, route guidance, destination selection, and map display. The navigation data 80 represent the aspects of roads that are important for these functions, such as which roads connect to each other, road names, speed limits along roads, address ranges along roads, and so on.

In the embodiment of FIG. 3, the navigation data 80 include data that represent road segments 84 and data that represent nodes 86. In the embodiment of FIG. 3, each discrete segment of each road is represented by a separate road segment data record. A road segment is a portion of a road between adjacent intersections or between a dead end and an adjacent intersection. A road segment may also be defined that ends at a point along a road between adjacent intersections. The navigation data 80 in the road database 60 may also include data records that represent aggregations of individual road segments.

A node refers to an endpoint of a road segment. For example, each road segment has two endpoints. Each endpoint of a road segment is represented with a node data record 86 the road database 60.

As stated above, the road network database 60 also includes physical configuration data 82. The physical configuration data 82 are used by the driver assistance systems (44 in FIG. 2) for safety and convenient features, such as obstacle avoidance, curve warning, adaptive cruise control, and so on. The physical configuration data 82 provides a representation of the road network that is different from the representation provided by the navigation data 80. For example, the physical configuration data 82 represent detailed physical aspects of the road lanes (including lane size and configurations), detailed aspects of intersections (including locations of vehicle paths through intersections), traffic signals (and placement thereof), shoulder locations, and other detailed aspects relating to roads and other physical features.

IV. Representation of Road Lanes

Referring to the embodiment shown in FIG. 3, the physical configuration data 82 includes data representations of lanes and data representations of intersections. The physical configuration data 82 may also include data representations of other types of features as well.

In this embodiment, the physical configuration data 82 includes a separate lane data entity (or record) 90 for each lane of each road in the geographic region. The lane data entity 90 includes a data entity ID that uniquely identifies the lane data record in the road database 60. Each lane data entity 90 identifies which road the lane is part of (e.g., by reference to a road segment ID in the navigation data 90) and the location of the lane (e.g., the starting location, the ending location).

The present embodiment takes into account that on the actual road network, some lanes form or end gradually over a longitudinal distance. Examples of gradually forming lanes are shown at 132 and 134 in FIG. 1. In the physical configuration data 82, lane data entities 90 are used in the road database 60 to represent whole portions of road lanes. A whole portion of a road lane includes that part where both edges of the lane are discernable and the lane is at full width. In the physical configuration data 82, a portion of a lane where the lane is at less than full width is not modeled as a lane, i.e., with a lane data record. Instead, a portion of a lane where the lane is at less than full width is modeled relative to the adjacent lane from which the partial lane is gradually forming (or merging into). A data attribute of the adjacent lane (or lanes) is used to indicate that a lane is starting or ending adjacent thereto. This way of modeling of gradually forming or merging lanes is compatible with the relative uncertainty associated with the paths for cars entering or leaving a lane that is forming or ending. A lane centerline is not provided for a partial width lane (i.e., where a lane is starting or ending gradually over a longitudinal distance). The data representation of gradually forming (or merging) lanes is described in more detail below in connection with the adjacency attributes.

The following considerations relate to the way lanes are represented in the physical configuration data 82.

(1). Lanes are represented so that they do not cross one another.

(2). A lane is represented so that it goes up to, but not through, the intersection at the end of the road segment of which it is a part. (This prevents any implied connectivity between lanes that is not consistent with reality.)

(3). An actual road lane may continue unbroken across multiple road segments, such as when a ramp splits off from (one lane of) the road. However, when a lane is represented in the physical configuration data 82, the lanes of each road segment are modeled separately. In other words, a lane, as represented in the physical configuration data 82, does not extend beyond the end of the road segment of which it is apart.

In the embodiment of FIG. 3, the physical configuration data 82 is compatible with the navigation data 80. This allows navigation-related applications (in the navigation system 51 in FIG. 2) to be compatible with driver assistance applications (44 in FIG. 2). This compatibility is supported in the road database 60 by including references between the navigation data 80 and the physical configuration data 82. For example, a representation of a lane in the physical configuration data 82 may refer to (e.g., by data record ID) the data record in the navigation data 80 that represents the road segment of which the lane is a part.

In the physical configuration data 82, the lane data record 90 includes various attributes 92 that describe features and/or aspects of the represented lane. Some of the attributes 92 of a lane include a "direction of travel", the "type of lane", a "validity period" and "access characteristics."

Some of the different types of lanes include a "through lane", a "left turn lane", a "right turn lane", a "center turn lane", a "left shoulder", a "right shoulder", a "merge", and a "ramp." The lane type "left shoulder" or "right shoulder" are used with a "validity period", as explained below. Full-time shoulders are not coded as lanes. "Left shoulder" and "right shoulder" are defined with respect to the driver's orientation. In a present embodiment, some combinations are allowed (e.g., through, left turn, and/or right turn can all be applied to the same lane at the same time).

The lane attribute "validity period" is used when a lane has different uses at different times (e.g., a shoulder that is used for through traffic at certain hours).

The lane attribute "access characteristics" includes a "yes/no" indicator for different vehicle types, such as autos, buses, taxis, trucks, bicycles, pedestrians, emergency vehicles, carpools, deliveries, through-traffic, and so on.

Figure 4A:
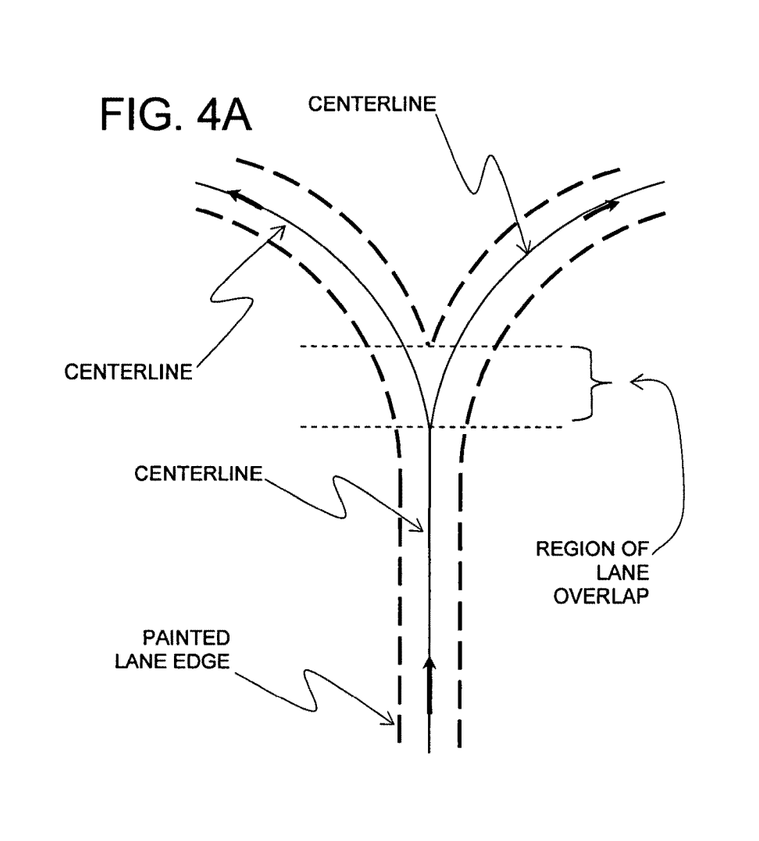
FIGS. 4A and 4B are illustrations of overlapping lanes.
Figure 4B:
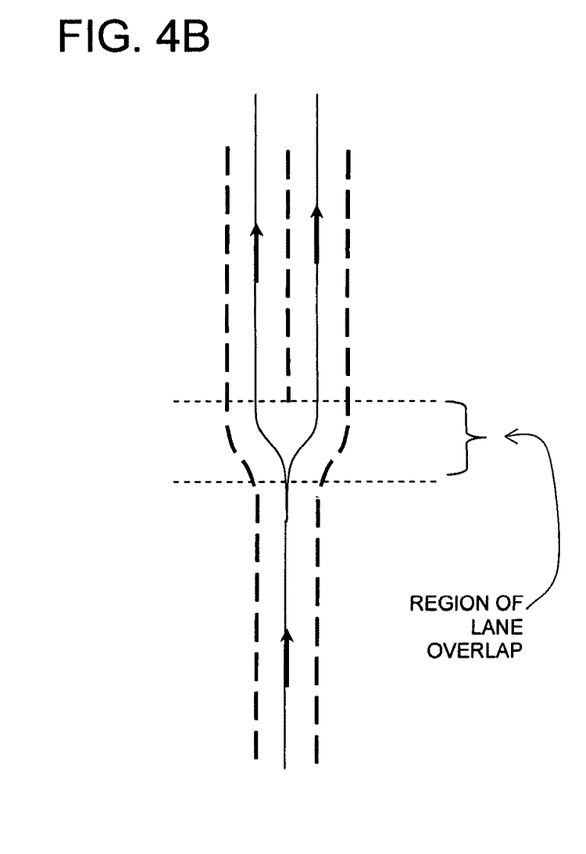

Additional lane attributes 92 may include road condition, roadside barrier, toll booth, lane marker type, road surface type, lane width, speed, and adjacency. (The adjacency attribute is described in more detail below.) If two lanes split, an attribute may be included that indicates that these lanes overlap. In the case of a true lane split, two lanes are modeled such that their centerlines start at the same point. These are attributed as "overlapping" to indicate that two lane surfaces share some of the same pavement. One example of overlapping lanes is shown in FIG. 4A. FIG. 4A shows three lanes on three different road segments. The road segments (and lanes) in FIG. 4A connect in a Y-shaped configuration. Overlapping lanes can occur on a single road segment. An example is shown in FIG. 4B.

In the physical configuration data 82, each data lane data entity 90 is associated with data 112 that defines the geometry of the lane. The geometry of a lane includes the longitudinal shape of the lane. For purposes of defining the longitudinal shape of a lane, a centerline of the lane is determined and used to represent the longitudinal shape. A data representation of a lane 90 includes data that defines the lane centerline for every whole portion of a road lane. The centerline is defined as the line midway between the lane edges. Lane edges can be lane markings (such as paint) and/or physical edges (such as a curb, median or edge of pavement). Defining lanes in this manner facilitates representation of lanes by making the data creation process reliable and reproducible.

The shape of the lane centerline can be expressed in various ways. Some of these ways include parametric curvatures or sets of shape points interpolated by straight line segments (e.g., a "polyline"). Examples of parametric curvatures include, but are not limited to, uniform B-splines, non-uniform B-splines, and clothoids.

The physical configuration data 82 includes data 116 that provides for defining attributes that apply to only a longitudinal subset of a lane. A longitudinal subset of a lane is referred to as a "sublane." In the physical configuration data 82, a sublane is defined by a pair of points along the lane, expressed as distances along the lane centerline from one end (e.g., a designated end) of the lane. In the embodiment of FIG. 3, a sublane is not defined to have geometry of its own. Instead, the geometry of the lane—of which the sublane is a part—is applied to the sublane. Defining sublanes in this manner allows attributes to begin and end as necessary along a lane without complicating the underlying lane geometry.

Figure 5:
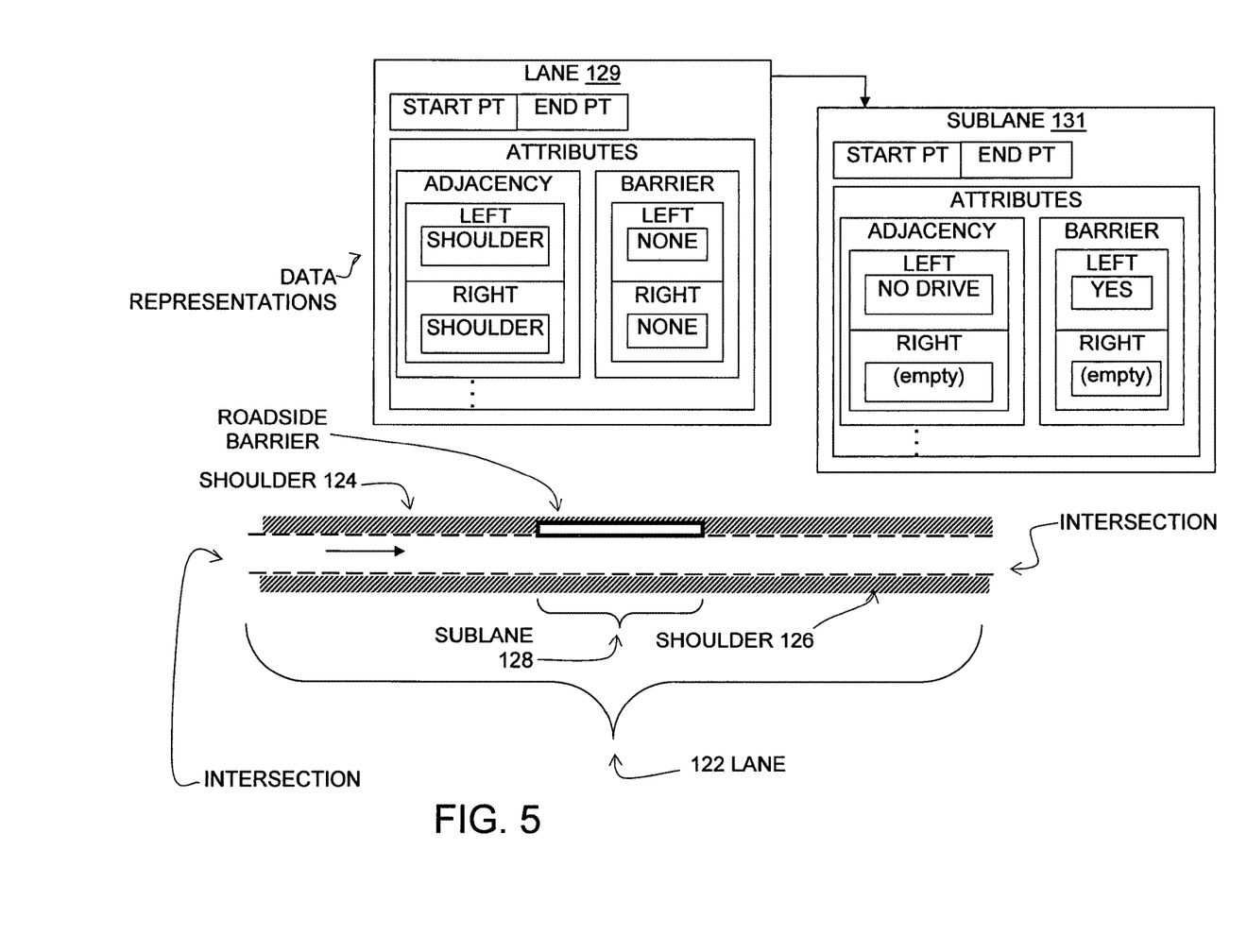
FIG. 5 is an illustration of a sublane and a data representation thereof.

When a sublane is defined, the attributes associated with the sublane supersede those same attributes of the associated lane. For example, FIG. 5 shows a physical lane 122 that has left and right shoulders 124 and 126 except for a portion 128. The portion 128 has a right shoulder, but on the left side has a barrier. In the physical configuration data 82, this lane would be represented by a lane data entity 129 that includes adjacency attributes that indicate that the lane 122 has shoulders on both sides. The lane data entity 129 would include roadside barrier attributes that indicate that the lane has no barriers on either side. In addition, a sublane data entity 131 would be defined for the lane 122. The sublane data entity would indicate a starting point and an ending point along the lane. The sublane data entity 131 would include adjacency attributes that indicate that the lane has no drivable surface on the left side. In addition, the sublane data entity 131 would include roadside barrier attributes that indicate that the lane has a roadside barrier on the left side. Thus, for that portion of the lane 122 that corresponds to the sublane 128, the attributes of the sublane data entity 131 would apply instead of the attributes of the lane data entity 129.

In a present embodiment, only those fields of a sublane data entity are populated that are different from the corresponding fields in the lane data entity that represents the lane of which the sublane is a part. Accordingly, in FIG. 5, the sublane data entity does not contain any information regarding the adjacency or barrier on the right side because the right-side adjacency and barrier situation of the sublane is not different than on the rest of the lane.

Several considerations apply to sublanes. A sublane does not extend past the end of the lane of which it is a part. Multiple sublanes may be defined for each lane. Sublanes may overlap each other, except that sublanes that overlap cannot change the same lane attributes. Sublanes that do not overlap may change the same lane attributes.

Another of the attributes 92 associated with the data representation of lanes 90 is data that indicates what is next to the represented lane on each side thereof. In one embodiment, each lane data entity 90 includes adjacency attributes 140. The adjacency attributes 140 indicate what lies to the left and right of a represented lane beyond the lane boundary. This attribute can be applied to the whole lane and also to a longitudinal subset of the lane (a "sublane").

The adjacency attribute may include data that indicate any of the following conditions:
 (1). another lane, which can be entered by a lane change,
 (2). another lane but which cannot be entered,
 (3). a lane that is in the process of forming,
 (4). a lane that is in the process of ending,
 (5). a shoulder,
 (6). another "drivable surface", e.g., not a lane or shoulder, but a surface that might have a vehicle on it, such as a parking lane or low median, or
 (7). no drivable surface, e.g., a drop-off, a barrier, etc.

This adjacency attribute 140 provides information that enables a driver assistance system (44 in FIG. 2) to determine an appropriate warning or operation relating to a lateral lane change. For example, the information provided by the adjacency attribute can be used to define where a lane change can legally occur. The information provided by the adjacency attribute can also be used to determine where other vehicles are likely to be present.

There are several additional considerations relating to the way that the physical configuration data represents lanes.

There is often (but not always) lateral connectivity between parallel lanes of a road that carry traffic in the same direction. For many roads, a vehicle traveling in one lane may change lanes at any point. This lateral connectivity is modeled with the embodiment disclosed herein. According to this embodiment, there may not be any particular points at which traffic can change from one lane to another, and the paths taken by vehicles to effect lane changes may vary, depending on driver preference and influenced by speed and traffic conditions.

Lanes can begin or end in the middle of a roadway, causing vehicle paths to move into or out of lanes. In the transitional areas where lanes begin or end, the physical centerline of the narrowing/widening lane may not correspond to a likely vehicle path. Moreover, the vehicle paths of cars entering or leaving forming or merging lanes is not necessarily predictable in many cases.

Lane-specific attributes may change at any longitudinal point along a lane. Different lanes along a road may have attribute changes at different longitudinal points. The embodiment disclosed herein provides for these changes by defining sublanes that have attributes that supersede those of their associated lanes.

In the embodiment disclosed herein, support is provided for representing the geometry of a lane more accurately than in conventional road databases. This higher level of accuracy may be required by some driver assistance applications.

Another consideration associated with the representation of lanes in the physical configuration data 82 is that the representation should be reliably derivable from practical source materials. For example, the representation of lanes in the physical configuration data 82 should be derivable from vehicle path data obtained from driving, overhead aerial imagery, or probe vehicle ("floating car") data.

V. Representation of Intersections

As stated above, the physical configuration data 82 also includes representations of intersections. Where roads intersect, the physical configuration data 82 models the relationships between the lanes that bring traffic into the intersection and the lanes that take traffic out. Modeling these relationships involves several considerations. For example, simply extending road lanes into an intersection area would lead to many lane-to-lane crossings that would imply connectivity between crossing lanes that may not be present in reality. In addition, if connectivity between lanes does exist, a simple extension of the lanes into the intersection area might indicate the point of the connectivity in the wrong place. For these reasons, as well as for other reasons, the physical configuration data 82 in the road database 60 includes a road lane data model that has road lanes that lead up to, but not through, intersections.

The following considerations are addressed by the intersection model used in the physical configuration data 82 in the road database 60:

(1). The road-to-road maneuvers that take place at an intersection, between specific lanes on the incoming and outgoing lanes, are described. In particular, a driver assistance application—in a vehicle heading into and through an intersection—is provided with the information needed to predict a likely vehicle location at some time or distance offset from the current vehicle position.

(2). The fact that some maneuvers through an intersection have predictable vehicle paths, whereas other maneuvers through the intersection do not have a predictable path, is accommodated.

(3). The interaction between traffic signals and traffic at the intersection is modeled. This modeling accounts for the case in which some traffic lanes or maneuvers are controlled by different aspects of the traffic signals (e.g., a left-turn signal). This modeling also accounts for the case in which some maneuvers at an intersections are governed by traffic signals and other maneuvers at the same intersection are not (e.g., a "Yield" on a right turn).

(4). Normal intersections are distinguished from special types of intersections such as roundabouts and railroad crossings that pose special considerations for driver assistance systems.

To support compatibility with navigation-related applications, the representations of intersections in the physical configuration data 82 are associated with the node data that represent the same corresponding actual physical intersections in the navigation data 80. Some actual physical intersections are represented by more than one node data record in the navigation data 80. For example, an intersection between a multiple-digitized road and a single digitized road may be represented by two or more node records in the navigation data 80. In such cases, the representation of an intersection in the physical configuration data 82 is associated with all the node records in the navigation data 80 that represent the same intersection.

Another consideration associated with the representation of an intersection in the physical configuration data 82 is that the representation should be reliably derivable from practical source materials. For example, the representation of an intersection in the physical configuration data 82 should be derivable from vehicle path data obtained from driving, overhead aerial imagery, or probe vehicle ("floating car") data.

The above considerations are addressed in an embodiment of the physical configuration data 82 disclosed herein.

As stated above, an intersection object 100 is a data entity in the road database 60. In a present embodiment, the intersection object 100 does not define shape or determine a position. Instead, the intersection object 100 defines the logical associations between the other data entities that represent the various physical components of the actual intersection. An intersection object 100 is defined for each road-to-road intersection represented in the road database 60.

Figure 6:
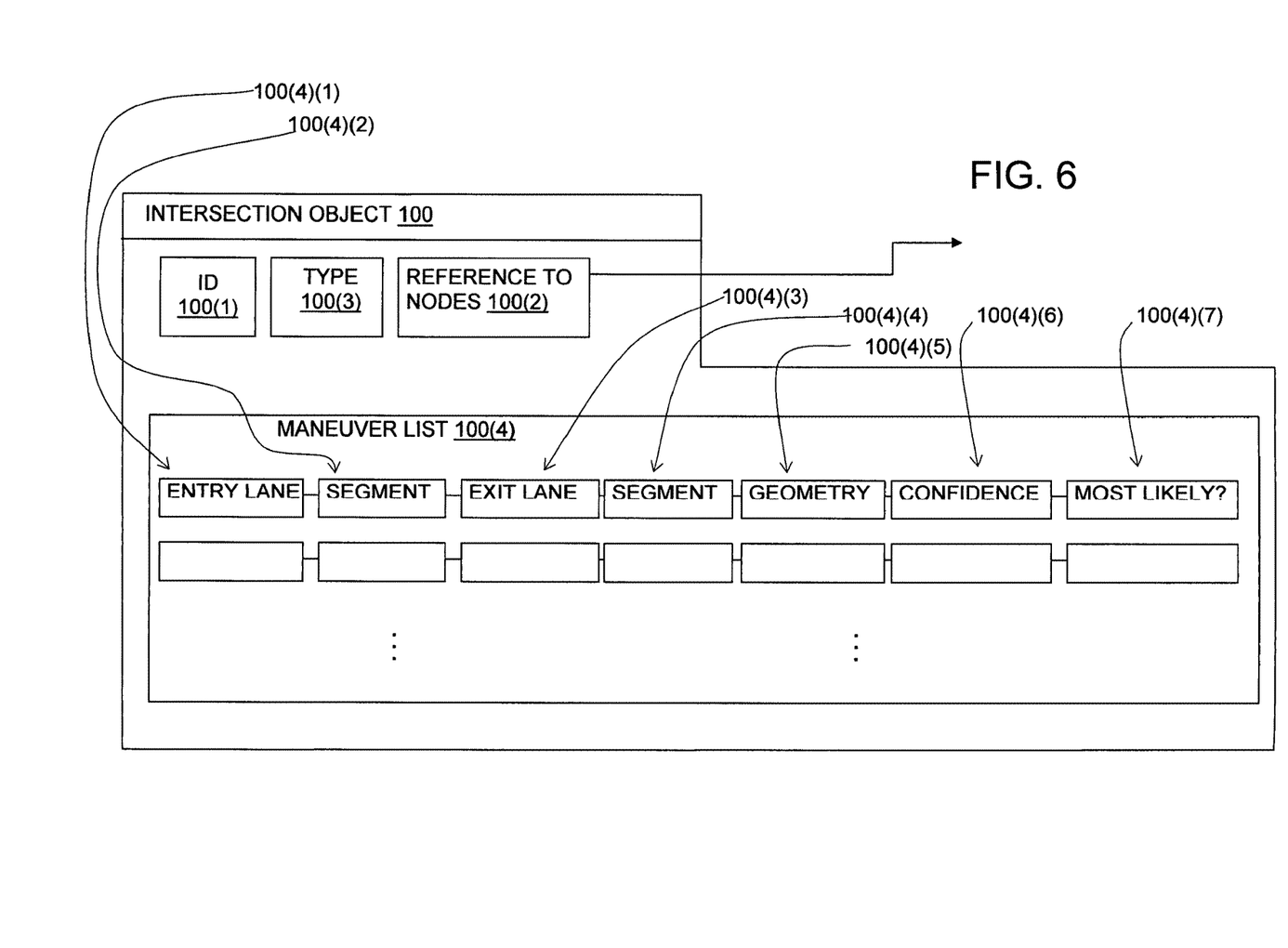
FIG. 6 is a block diagram that shows components of one of the intersection objects shown in FIG. 3.

Referring to FIG. 6, each intersection object 100 is identified by a unique ID, (e.g., an intersection object ID 100(1)).

Each intersection objection 100 is logically associated with (i.e., references) one or more of the nodes (by node ID) that represent the intersection in the navigation data 80. Accordingly, each intersection objection 100 includes a reference 100(2) to one or more node IDs. By referencing the node IDs that represent the intersection in the navigation data 80, the intersection object 100 associates the representation of the physical configuration of the road with the navigation representation of the road network.

Each intersection object 100 includes an attribute 100(3) that identifies the intersection type. The intersection type attribute 100(3) identifies the represented intersection as "standard," "roundabout," or "railroad crossing." Most represented intersections are "standard." An intersection like the one in FIG. 7 (i.e., intersection 200) would be represented as a "standard" intersection.

Figure 7:
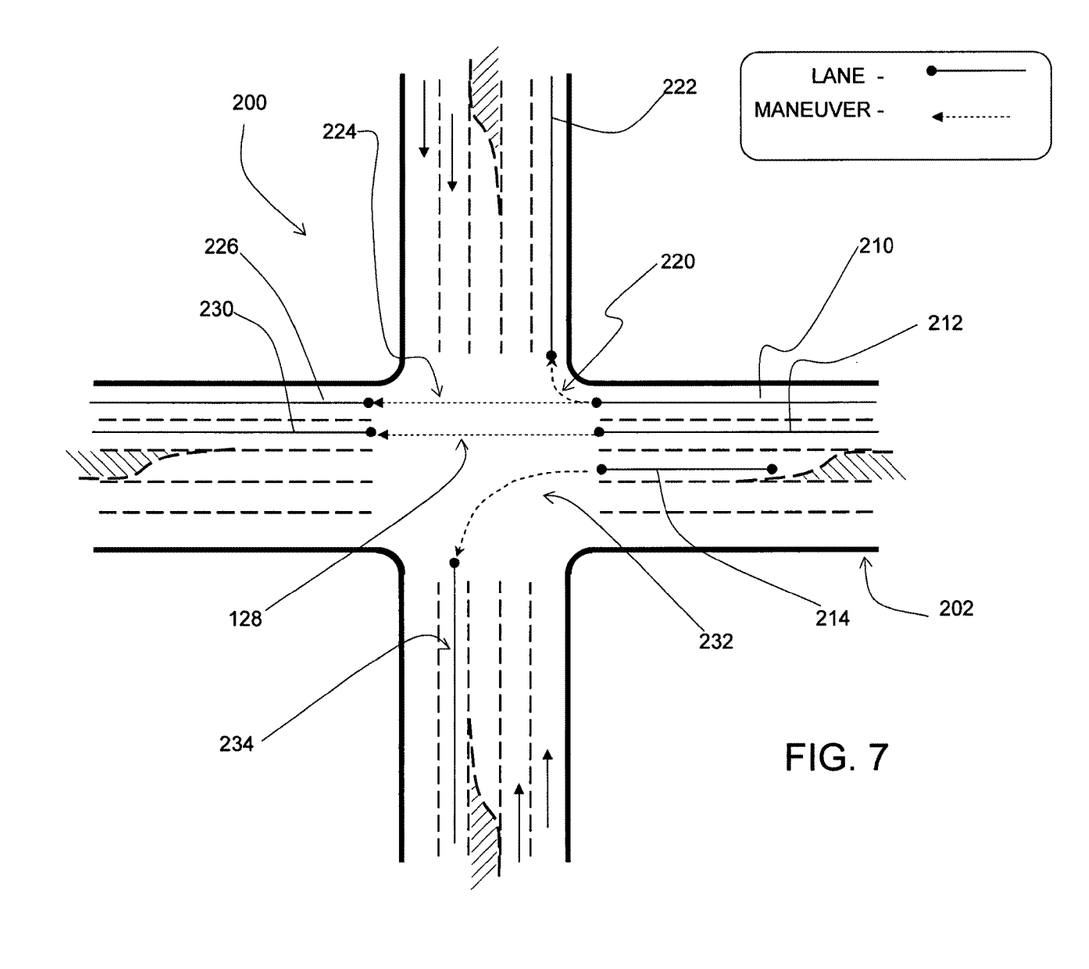
FIG. 7 is an illustration of an intersection showing several transversals thereof from some of the lanes that lead into the intersection.

Referring to FIG. 6, the intersection object 100 includes a maneuver list 100(4). The maneuver list 100(4) includes entries for all the reasonable, legal transversals from a lane entering the represented intersection to a lane leaving the represented intersection. For example, referring to FIG. 7, the maneuvers from three of the lanes 210, 212 and 214 entering the intersection 200 are shown. The lane 210 that enters the intersection 200 has one maneuver 220 onto the lane 222 and another maneuver 224 onto the lane 226. The lane 212 that enters the intersection 200 has only one maneuver 228, i.e., onto the lane 230. Likewise, the lane 214 that enters the intersection 200 has one maneuver 232 onto the lane 234. (For the sake of clarity, FIG. 7 illustrates the maneuvers from only the three lanes 210, 212, and 214 that enter the intersection 200 from the road segment 202. It is understood that the intersection object that represents the intersection 200 would include all the maneuvers from all the lanes from all the rest of the road segments that enter the intersection.)

Each entry in the maneuver list 100(4) in FIG. 6 includes several kinds of data about the represented transversal. Referring again to FIG. 6, an entry in the maneuver list identifies the entry lane 100(4)(1) and the exit lane 100(4)(3) for the maneuver. The entry lane and the exit lane are identified by lane data entity IDs. In the embodiment of FIG. 4, the entry in the maneuver list 100(4) also indicates the segment of which the entry lane is a part 100(4)(2) and the segment of which the exit lane is a part 100(4)(4). In this embodiment, these segments are identified by road segment IDs (i.e., references to the road segment records in the navigation data 80).

An entry in the maneuver list 100(4) also identifies the geometry 100(4)(5) of the maneuver. At a minimum, the geometry is identified as a straight line between the end of the incoming lane 100(4)(1) and the start of the outgoing lane 100(4)(3). If the entry and exit lanes physically meet (such as in the intersection 236 illustrated in FIG. 8), the geometry 100(4)(5) indicates the single point where the entry end exit lanes physically meet. If the travel path of a vehicle between the entry lane and the exit lane is curved, this geometry 100(4)(5) may indicate this path by defining a parametric curve.

An entry in the maneuver list 100(4) also includes a confidence indication 100(4)(6). The confidence indication 100(4)(6) relates to the maneuver's geometry 100(4)(5). The confidence indication 100(4)(6) indicates the likelihood that the geometry of the maneuver accurately predicts or represents a vehicle path. For example, it is possible that a basic straight-line connection between an entry lane and an exit lane is highly indicative of actual vehicle paths, such as when going straight through an intersection. It is also possible that even for a turning maneuver, the vehicle path is highly predictable and well known. However, it is also possible that the vehicle path geometry through a maneuver is variable or even unknown.

Figure 9:
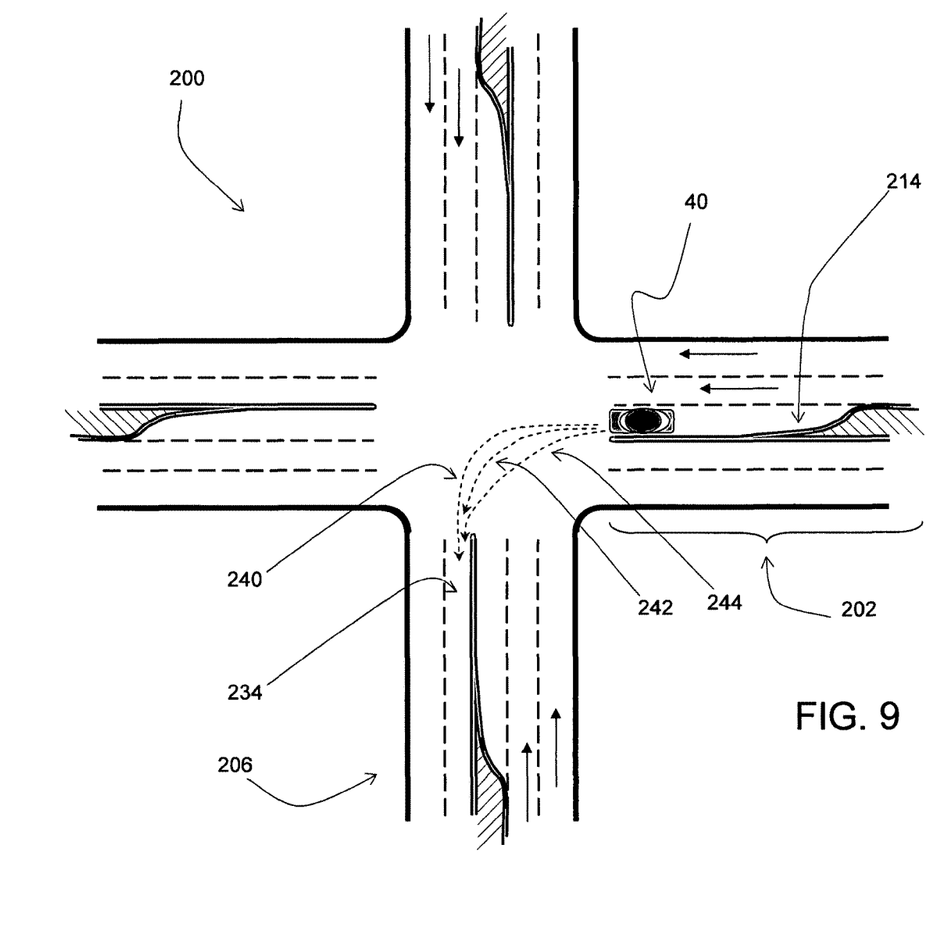
FIG. 9 shows the intersection depicted in FIG. 7 with several valid vehicle paths for a transversal of the intersection from one lane to another, illustrating that the transversal has a low confidence rating.

FIG. 9 shows several possible paths, labeled 240, 242 and 244, that a vehicle could legally take when traveling from the left turn lane 214 on the road segment 202 onto the lane 234 on the road segment 206. Each of these several possible paths is a legal path. The entry for this transversal in the maneuver list 100(4) in the intersection object 100 that represents this intersection would include the geometry for only one of these paths. In addition, the maneuver entry for this transversal would have a low confidence indication 100(4)(6), i.e., meaning that the probability of the vehicle actually being on the path indicated by the geometry 100 (4)(5) is relatively low. This confidence indication 100(4)(6) is used by driver assistance applications (52 in FIG. 2) to determine if a vehicle's deviation from the maneuver geometry is of concern.

In a present embodiment, the confidence indication 100 (4)(6) is set to one of several values. These values include the following:

(1). None—When the confidence indication 100(4)(6) is set to "None", the geometry 100(4)(5) is set to indicate a straight-line connection. However, this straight line geometry is not intended to represent an actual vehicle path.

Figure 8:
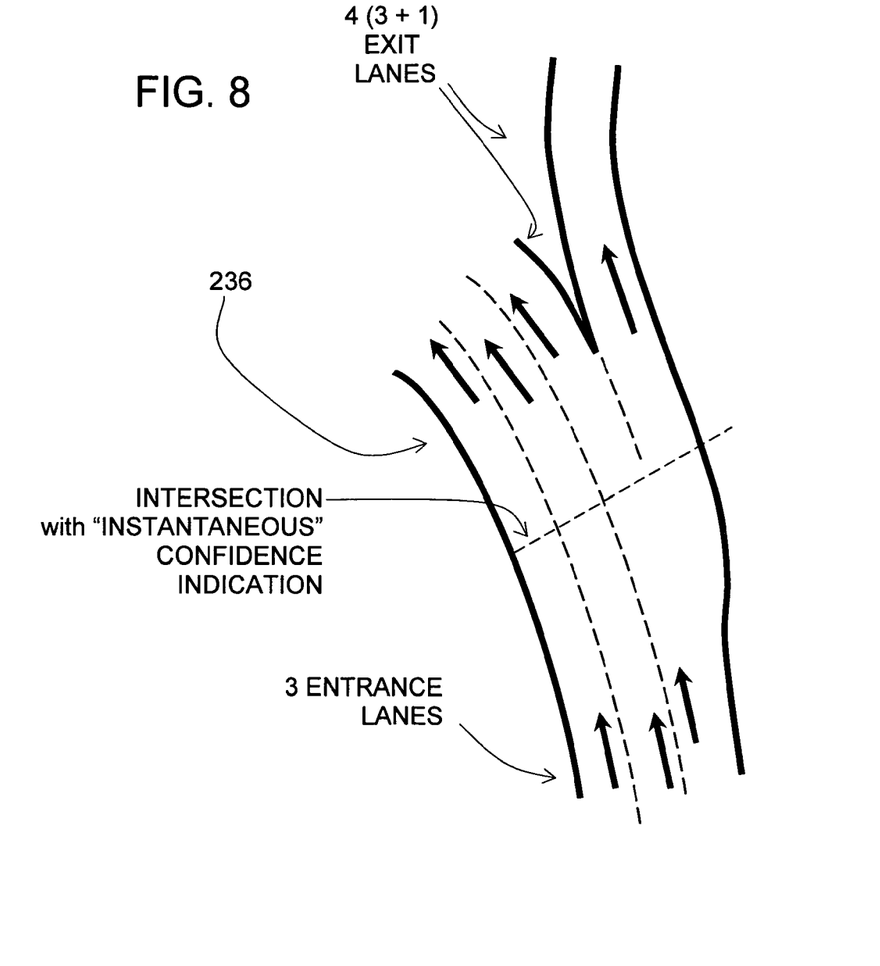
FIG. 8 is an illustration of an intersection in which the transversals are instantaneous.

(2). Instantaneous—When the confidence indication 100 (4)(6) is set to "instantaneous", the incoming and outgoing lanes meet with no gap or cross-traffic. An example of an intersection with no gap between the incoming and outgoing lanes and therefore an instantaneous confidence indication, is shown in FIG. 8.

(3). Actual, high confidence—The confidence indication 100(4)(6) is set to "Actual, high confidence" when the geometry is based on accurate sources such as probe vehicle data with small statistical variance.

(4). Actual, variable—The confidence indication 100(4) (6) is set to "Actual, variable" when the geometry is based on sources that indicate a higher statistical variance.

(5). Cartooned, high confidence—The confidence indication 100(4)(6) is set to "Cartooned, high confidence" when the geometry is typically, a straight-line connection for a straight-through maneuver between lanes that line up well.

(6). Cartooned, medium confidence—The confidence indication 100(4)(6) is set to "Cartooned, medium confidence" when the geometry is digitized from tire artifacts or other evidence that does not provide a statistical variance.

(7). Cartooned, low confidence—The confidence indication 100(4)(6) is set to "Cartooned, low confidence" when the geometry is digitized logically but without supporting evidence.

An entry in the maneuver list 100(4) also includes an indication 100(4)(7) whether the maneuver is the "most likely path" for traffic coming from the associated incoming lane. This indication is meaningful when two or more maneuvers are possible from the same lane. This will help a driver assistance application (52 in FIG. 2) determine a likely lane-level position.

An entry in the maneuver list 100(4) also includes an indication 100(4)(8) whether traffic signals are present at the intersection and an indication as to which particular signal(s) govern traffic for this maneuver. It is possible that all maneuvers for a particular incoming lane will share the same signals, but it is also possible that maneuvers for different incoming lanes will be governed by different traffic signals.

In addition to the information indicated above, the intersection object may include additional data.

Roundabouts

As mentioned above, an intersection objection 100 includes an attribute that indicates an intersection type. One of the intersection types is "roundabout." Having information that indicates that an intersection is a roundabout is useful for driver assistance applications that involve sensing the path ahead of a vehicle. When a vehicle enters a roundabout intersection, it follows a circular path in a single rotational direction around a center island of the roundabout. Thus, the vehicle entering a roundabout from an entry lane may actually travel in a direction away from the exit lane as it travels around the roundabout. A driver assistance application that senses the path ahead of the vehicle uses the information that an intersection is a roundabout to account for the vehicle path traveling around the roundabout.

Railroad Crossings

As mentioned above, another type of intersection is a "railroad crossing." Note that an intersection indicated to be a "railroad crossing" is not necessarily an intersection of actual roads. However, in a present embodiment, railroad crossings are represented by intersection objects, in part because of the presence of metal rails that may be detected by in-vehicle sensors.

A railroad crossing is similar to a road crossing in that the lanes may not be well defined through the crossing. A railroad crossing may present radar targets (not only trains but also metal rails), and may have marked stopping positions.

VI. Operation

As mentioned above, a vehicle that has a driver assistance system uses a road database that has road physical configuration data to provide safety or convenience features. On a continuous basis, a position of the vehicle relative to the road network is determined. This function is performed by a positioning system in the vehicle. Using the physical configuration data, the driver assistance applications can predict the path ahead of a vehicle as the vehicle travels along roads and through intersections. This allows the driver assistance systems to provide safety and convenience features as the vehicle travels along roads and crosses intersections.

VII. Alternatives

One alternative embodiment pertains to the way that lanes of less than full width are represented. The above-described embodiments disclose ways to model lanes that are less than full width. Lanes that are less than full width include lanes that are forming and lanes that are ending (e.g., merging into another lane). According to some above-described embodiments, a lane that is less than full width is not modeled as a lane (i.e., with a data record), but instead is modeled as an attribute of an adjacent lane (or a sublane of an adjacent lane). In one alternative embodiment, lanes that are less than full width are modeled as lanes. According to this alternative, lanes that are less than full width are represented using lane data entities. In this alternative, data entities that represent these types of lanes include an attribute that indicates that the represented lane is less than full width (e.g., a "transitioning lane"). A data entity that represents a transitioning lane may include some or all the attributes of a full lane. For example, a data entity that represents a transitioning lane may indicate start and end points. A data entity that represents a transitioning lane may also include adjacency attributes. The adjacency attributes of a transitioning lane would indicate what features are located next to the transitioning lane. A data entity that represents a transitioning lane may also include a centerline. The centerline of a transitioning lane may be determined from the actual physical dimensions of the transitioning lane or alternatively the centerline may be estimated from the start and end points of the transitioning lane.

Another alternative embodiment pertains to the representation of intersection maneuvers. In one of the embodiments disclosed above, it was stated that a confidence level is associated with the geometry of an intersection maneuver. For example, referring to again to FIG. 9, there are several possible legal paths, 240, 242 and 244, that a vehicle could legally take when traveling from the left turn lane 214 on the road segment 202 onto the lane 234 on the road segment 206. In the previously described embodiment, the maneuver entry for this transversal would have a low confidence indication, i.e., meaning that the probability of a vehicle actually being on the path indicated by the geometry is relatively low. In an alternative embodiment, the maneuver entry for this traversal may include an indication of a likely lateral deviation from the given path. For example, referring still to FIG. 9, the maneuver entry for the traversal would indicate the geometry for one path (e.g., path 242) and in addition, the maneuver entry would specify a lateral deviation that would indicate the maximum distance from the path 242 to the path 240 or the path 244. The lateral deviation data would be in addition to or a substitute for the confidence level data associated with the maneuver entry.

VIII. Advantages

The embodiment of a road database, described above, and in particular, the way that the physical configuration data represents lanes, provides several advantages. The way that the physical configuration data represents lanes provides a level of detail that enables driver assistance applications (52 in FIG. 22) to function. For example, the way that the physical configuration data represents lanes enables a lane departure warning system to function. In addition, the way that the physical configuration data represents lanes enables a forward collision warning system to function by providing the data the system needs to determine whether an object detected ahead of the vehicle is inside or outside the vehicle's lane.

It is intended that the foregoing detailed description be regarded as illustrative rather than limiting and that it is understood that the following claims including all equivalents are intended to define the scope of the invention.

We claim:

1. A method comprising:
    storing, in a navigation database, at least one data representation of a road lane including a boundary for the road lane and an adjacency attribute for the at least one data representation of the road lane, wherein the adjacency attribute for the road lane describes at least one feature adjacent to the road lane and outside of the boundary for the road lane;
    receiving, at a driving assistance system, data from one or more sensors of a vehicle;
    accessing, from the navigation database, the adjacency attribute for the at least one data representation of the road lane; and
    generating data indicative of an action for the driving assistance system in response to the adjacency attribute accessed from the navigation database.

2. The method of claim 1, wherein the data indicative of the action for the driving assistance system controls a mechanical system of the vehicle.

3. The method of claim 2, wherein the mechanical system includes the brakes of the vehicle.

4. The method of claim 1, further comprising:
    capturing an image including at least part of an environment of the vehicle, wherein the image is the data from the one or more sensors of the vehicle.

5. The method of claim 1, wherein the data indicative of the action for the driving assistance system includes a driver warning.

6. The method of claim 1, wherein the data indicative of the action for the driving assistance system includes an obstacle warning, an obstacle avoidance, a lane departure warning, a collision warning, a collision avoidance, adaptive cruise control, adaptive transmission operation, or automatic headlight aiming operation.

7. The method of claim 1, wherein the data indicative of the action for the driving assistance system includes a warning or operation for a lateral lane change.

8. The method of claim 1, wherein the driving assistance system determines where a lane change is possible along the at least one data representation of the road lane.

9. The method of claim 1, wherein the driving assistance system determines where other vehicles are likely to be present along the at least one data representation of the road lane.

10. The method of claim 1, wherein the at least one data representation of the road lane indicates a transitioning lane that is less than full width and the adjacent attribute represents one or more features adjacent to the transitioning lane.

11. The method of claim 1, wherein the adjacency attribute for the at least one data representation of the road lane describes at least one feature adjacent to the road lane on a first side thereof and at least one feature adjacent to the road lane on a second side thereof.

12. A method comprising:
    receiving at least one data representation of a road lane including a boundary of the road lane and an adjacency attribute for the at least one data representation of the road lane, wherein the adjacency attribute for the road lane describes at least one feature adjacent to the road lane and outside of the boundary for the road lane;
    receiving data from one or more sensors of a vehicle; and
    generating data indicative of an action for the driving assistance system in response to the adjacency attribute.

13. The method of claim 12, wherein the data indicative of the action for the driving assistance system controls a mechanical system of the vehicle.

14. The method of claim 13, wherein the mechanical system includes the brakes of the vehicle.

15. The method of claim 12, wherein the data indicative of the action for the driving assistance system includes a driver warning.

16. The method of claim 12, wherein the data indicative of the action for the driving assistance system includes an obstacle warning, an obstacle avoidance, a lane departure warning, a collision warning, a collision avoidance, adaptive cruise control, adaptive transmission operation, or an automatic headlight operation.

17. The method of claim 12, wherein the data indicative of the action for the driving assistance system includes a warning or operation for a lateral lane change.

18. The method of claim 12, wherein the driving assistance system determines where a lane change is possible along the at least one data representation of the road lane.

19. An apparatus comprising:
   at least one processor; and
   at least one memory including computer program code for one or more programs; the at least one memory and the computer program code configured to, with the at least one processor, cause the apparatus to at least perform:
   storing at least one data representation of a road lane including a boundary for the road lane and an adjacency attribute for the at least one data representation of the road lane, wherein the adjacency attribute for the road lane describes at least one feature adjacent to the road lane and outside of the boundary for the road lane;
   receiving data from one or more sensors of a vehicle;
   accessing the adjacency attribute for the at least one data representation of the road lane; and
   generating data indicative of an action for a driving assistance system in response to the adjacency attribute accessed from the navigation database.

* * * * *